United States Patent [19]

Kristinsson

[11] 4,070,616

[45] Jan. 24, 1978

[54] METHOD AND APPARATUS FOR DETECTING FISH IN WATER

[76] Inventor: Bjorn Kristinsson, Tomasarhagi 21, Reykjavik, Iceland

[21] Appl. No.: 687,750

[22] Filed: May 19, 1976

[30] Foreign Application Priority Data

May 22, 1975 Iceland .................................. 2275

[51] Int. Cl.² ...................... G01R 27/02; G06M 11/00
[52] U.S. Cl. ............................ 324/65 R; 235/92 PK; 235/92 R
[58] Field of Search .......... 235/92 PK, 92 TC, 98 A, 235/98 R; 346/33 EC, 33 R; 324/65 R

[56] References Cited

U.S. PATENT DOCUMENTS 2,893,633  7/1959  Van Haagen .................. 235/92 PK
3,223,319  12/1965  Lucich et al. .................. 235/92 PK
3,439,358  4/1969  Salmons ........................ 346/33 R
3,509,325  4/1970  Rockwell et al. ............... 235/92 PK Primary Examiner—Joseph M. Thesz
Attorney, Agent, or Firm—Emory L. Groff, Jr.

[57] ABSTRACT

Apparatus for detecting and counting fish in a stream in which three electrodes extend horizontally across the stream and are immersed in the water, the electrodes being connected to form the two arms of an alternating current bridge circuit, the signal output of the bridge being processed to provide a data signal for feeding to a counter or other recording means, the apparatus being arranged so that a fish causes upsetting of the balanced conditions in the bridge, further electrodes connected in an opposite sense providing compensation for wave motion effects on the signal.

5 Claims, 3 Drawing Figures

METHOD AND APPARATUS FOR DETECTING FISH IN WATER

BACKGROUND OF THE INVENTION

This invention relates to a method and apparatus for sensing the presence, measuring or counting fish such as salmon in fresh water such as a stream, whereby control or assessment of fish in migration across a selected site may be achieved. In use the apparatus is positioned at a suitable point in the path of migration and a sensor detects the presence of fish which can be recorded in various ways, such as on a numerical counter, a printer or a chart recorder. In this way data on the migration as a function of time can be assessed.

Known methods for counting fish in streams comprise directing the fish into a trap by obstructing the stream except for an opening into the trap and then counting by observation or directing the fish into a tunnel or a rectangular duct or opening and sensing by photocells or by the change in conductivity a fish causes between two electrodes as a result of the higher electrical conductivity in the body of the fish as compared with the water. All these methods require specially constructed surroundings in that the stream is made more narrow and the free passage is then through a counting tube, or alternatively fine meshed nets direct the fish into the sensor area. These methods are expensive in initial cost if permanently installed and when nets are used the operating costs are high. A variation of these methods is to use a fyke-net which is a special trawl like net placed in the stream and which ends in a bag or an open box. The fish are then counted by visual inspection. This method is most suitable for fish migrating downstream, such as smolt.

Acoustic methods are also used with a number of sensors arranged across the path of migration. This equipment is also expensive.

The counting of fish in open streams has however remained a problem and this invention provides a method and an apparatus for this purpose using an electrical current for measuring and counting fish in open streams or water using the higher conductivity of a fish as compared to fresh water and a linear sensor placed across the path of the migrating fish which does not require narrowing of the stream. The invention also provides in a preferred embodiment means for reducing noise and disturbing signals acting on the sensor.

SUMMARY OF THE INVENTION

According to this invention there is provided a method for sensing the presence of fish in water having a different electrical conductivity from the fish by using at least three main electrodes, forming two or more pairs of electrodes constituting the arms of a current bridge to detect difference in currents between the arms and to compensate for any change in conductance common to both pairs of electrodes the electrodes being immersed in water and the difference currents being fed to a measuring means.

Electrodes are placed in the path of the fish i.e. three main electrodes at least, which may be steel cables, spaced a small distance apart and insulated from each other. Between the cables is set up an electrical field in order to sense conductivity changes by the use of a measuring bridge. In addition to the main electrodes, auxiliary electrodes, two or more, are used. These are connected to a compensation network in order to reduce the influence of wave motion. Furthermore, it is possible to place a float on the surface above the sensor to reduce the effect of wave motion still more. The sensor is connected to electronic instruments for the processing of signal data and recording. The electronic part may contain a microprocessor.

The invention provides also an apparatus for sensing fish, comprising three or more main electrodes connected to a current bridge circuit in order to create a difference current, the electrodes being fed by a power supply unit and connected to a compensating network, a measuring bridge, an amplifier and a filter, a chart recorder or a counter, a data processing unit for measuring amplitude and duration sensing, for feeding to a display, printing or recording means.

BRIEF DESCRIPTION OF THE DRAWINGS

The invention is illustrated, by way of example, with reference to the accompanying drawings showing an embodiment, in the drawings.

DESCRIPTION OF THE PREFERRED EMBODIMENTS

Figure 1:
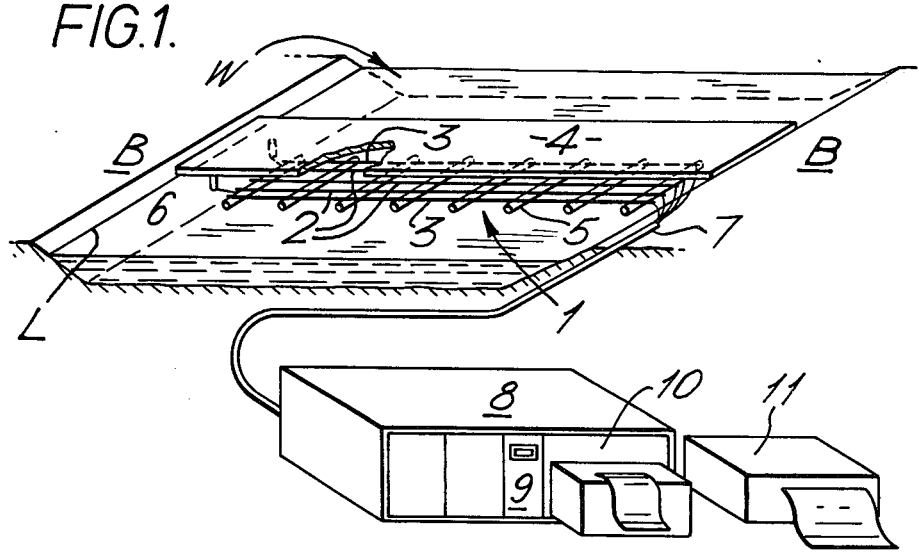
FIG. 1 shows schematically an apparatus located across a stream.

As shown in FIG. 1 a flat sensor grid or mat 1 has three main or active electrodes 2 and two auxiliary electrodes 3 supported below a float 4 on the surface of a stream W with a water level at L between banks B. The electrodes 2, 3 are separated and electrically insulated from each other by rods or tubes 5 of a plastics material. The float 4 carrying the mat 1 is moored to the banks B of the stream W and the electrodes are connected through an electric cable 7 to the electronic measuring unit 8. The unit 8 includes a counter 9, printing device 10 and a chart recorder 11.

Figure 2:
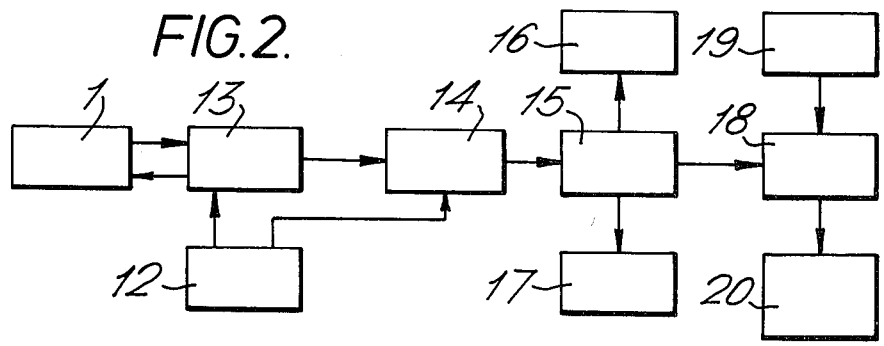
FIG. 2 shows a block diagram of the detecting apparatus.

FIG. 2 shows, in block diagram form, the circuit of the measuring unit 8. The mat 1 is supplied with alternating current from a power unit 12 through a compensating unit 13 and the wanted data signal from the mat 1 is extracted by the compensating unit which also effects noise reduction by using compensation. The data signal is fed to a synchronous rectifier or detector 14 and amplified and filtered at 15. The processed signal obtained may be used to increment a counter 16, or recorded on a chart recorder 17. The signal from filter 15 is also fed to a digital processor 18 which is connected to a clock pulse source 19, whereby the signal is translated to a form suitable for a recording device or printer 20. A microprocessor may be used functioning as a filter, clock, and processing unit. The circuitry in general used for processing the signal from the mat 1 is known and is therefore not described in detail.

Figure 3:
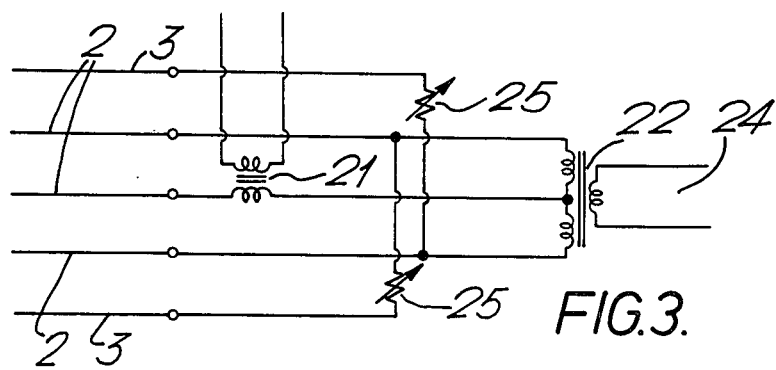
FIG. 3 shows the configuration of the electrodes embodying compensation.

The functioning of the detector and compensating device 13 is described in conjunction with FIG. 3. Alternating current is fed to the main electrodes 2 of the mat through a transformer 21 and any difference current between the outer arms of the electrodes is sensed by a transformer 22 providing an output data signal 24 for further processing. The auxiliary electrodes 3 are connected with opposed electrodes 2 through adjustable resistors 25 which provide compensation or balancing of the bridge circuit according to conditions.

The main electrodes are spaced a small distance apart and they may be steel cables. An electrical field is produced and set up in the water around the electrode and any change in conductivity caused by the presence of fish alters the conditons in the measuring bridge circuit formed which is sensed and processed. The auxiliary electrodes are connected to reduce the effect of wave motion which can be further reduced by floats carrying the sensors.

The processor 18 (FIG. 2) is arranged to sense the direction the fish pass under the mat 1 by sensing the pulse sequence, for example a negative pulse followed by a positive pulse may indicate a fish swimming upstream, whereas a reversal of the pulse sequence indicates a fish swimming downstream. The amplitude of the pulses serve as a measure of the fishes size and the pulse duration is an indication of the time the fish spends swimming across the mat 1.

The spacing of the electrodes 2 determines the resolution of the device and is chosen according to the minimum size of fish to be sensed, for example between 12 cm length for smolt and 70 cm length for large salmon. The length of the electrodes 2 is goverened by noise originating in the river or stream and a typical length is 10m for small, noisy rivers.

The a.c. signal fed to the bridge circuit is in the audio frequency range and 400 Hz is typical. The measurement which principally is carried out is the counting of the passage of fish across the mat but record of size, direction of passage and time of passage may also be assessed as previously mentioned. For Example a typical printout from the apparatus includes: DAY-HOUR-TOTAL COUNT (Hourly); MINUTES-SECONDS-VELOCITY-SIZE-DIRECTION (at the occurrence of each event).

Errors may of course occur due to fish swimming too close together across the mat, but such errors are goverened by statistics and may be allowed for in a similar way as in radioactive particle counting methods. This has not proved to be a problem in rivers up to medium size.

I claim:

1. An apparatus for sensing the presence of fish within a volume of water by measuring the conductivity of the water, the fish having an electrical conductivity differing from that of water, the apparatus comprising at least three longitudinally extending primary electrodes positioned within the volume of water, and arranged symmetrically, a centre one of the electrodes defining in conjunction with each other electrode a conductive path through the water which forms an arm of an electrical bridge circuit the said bridge circuit further including a first coupling means to introduce an alternating current signal produced by a signal generating means, and a second coupling means at an output of which a signal is produced when the bridge arms are out of balance, second electrodes positioned adjacent two primary electrodes within the volume of water and also connected to the bridge circuit through variable attenuating means by which the bridge circuit may be set to a balance condition, the secondary electrode is further positioned in relation to the primary electrodes and water surface to reduce the affect of wave motion on the balance condition of the bridge circuit.

2. An apparatus according to claim 1, in which the secondary electrodes are positioned in relation to the primary electrodes to contribute a signal to the respective arms of the bridge in such a way that the signal when a high wave occurs above one secondary electrode is added to the signal present when a low wave occurs at an opposed primary electrode.

3. An apparatus according to claim 1, wherein the primary and secondary electrodes are supported by a float means above the electrodes and on the surface of the water.

4. An apparatus according to claim 1, wherein two secondary electrodes form a current field and are positioned above the field of the primary electrodes in a zone affected by wave motion, each secondary electrode being connected to the bridge circuit through an adjustable resistor.

5. An apparatus according to claim 1, wherein the first coupling means comprises a transformer, and the second coupling means comprises a transformer with two secondary windings each forming one of the two other fixed arms of the bridge circuit.

* * * * *